United States Patent

[11] 3,582,678

| [72] | Inventors | David C. Davis, Jr<br>Clearwater;<br>Carl T. Nations, St. Petersburg, both of, Fla. |
|---|---|---|
| [21] | Appl. No. | 848,771 |
| [22] | Filed | Aug. 6, 1969 |
| [45] | Patented | June 1, 1971 |
| [73] | Assignee | Sperry Rand Corporation |

[54] PULSE INTERVAL MEASUREMENT APPARATUS
8 Claims, 1 Drawing Fig.

[52] U.S. Cl. ................................................. 307/234,
307/238, 307/243, 307/246, 307/247, 307/251, 307/293, 324/189, 328/129
[51] Int. Cl. ........................................................... H03k 5/20
[50] Field of Search ........................................... 307/232, 234, 238, 243, 246, 247, 251, 269, 293; 328/129, 135; 324/68 A, 189

[56] References Cited
UNITED STATES PATENTS

| 2,963,646 | 12/1960 | Hicks et al. | 324/68 |
| 3,324,309 | 6/1967 | Zeller, Jr. | 307/290 |
| 3,492,424 | 1/1970 | Hare et al. | 307/269X |
| 3,506,881 | 4/1970 | Leary | 307/293X |
| 3,521,141 | 7/1970 | Walton | 307/246X |

OTHER REFERENCES

Nassimbene, "Pulse Interval Detector," I.B.M. Technical Disclosure Bulletin, November 1964, p 455. 307/234

Prot, "Time Interval Detecting Device," I.B.M. Technical Disclosure Bulletin, April 1965, pp 1111 & 1112. 307/234

*Primary Examiner*—Stanley T. Krawczewicz
*Attorney*—S.C. Yeaton

ABSTRACT: First and second transistor switching pairs are connected to receive first and second pulses respectively. Each switching pair is biased to respond only when the instantaneous value of the appropriate pulse exceeds a predetermined threshold. A capacitor is charged through a constant current network from the time that the first switching pair is actuated until the time that the second switching pair is actuated so that the magnitude of the charge on the capacitor represents the time interval between pulses. Individual halves of a dual FET are connected in hold and discharge circuits across the capacitor.

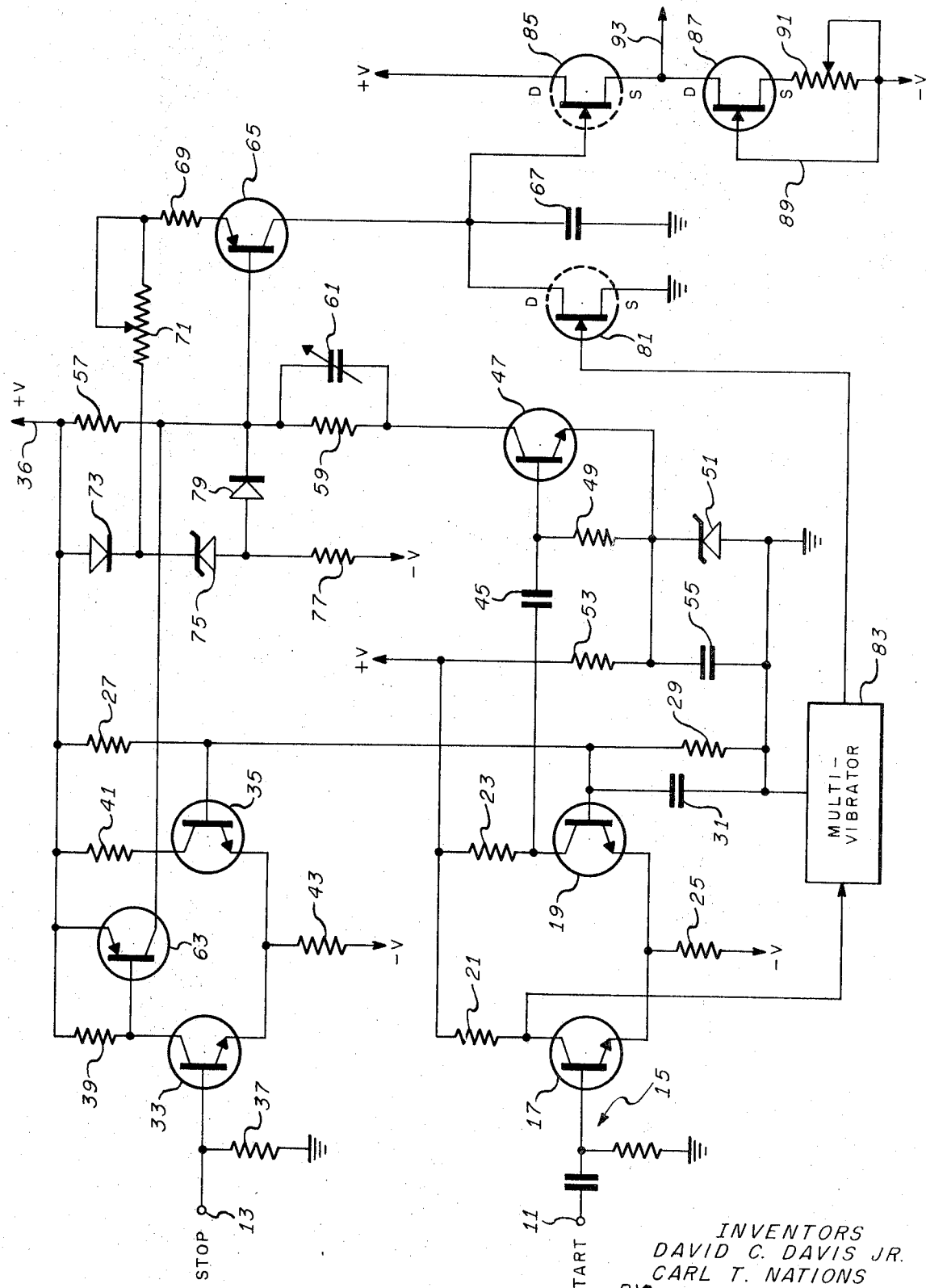

PULSE INTERVAL MEASUREMENT APPARATUS

BACKGROUND OF THE INVENTION

The present invention relates to apparatus for measuring short time intervals and more specifically to apparatus for measuring time intervals between consecutive electrical pulses.

In digital environments, for example, it is frequently necessary to measure the propagation time required for a pulse to pass through a given circuit.

Thus, two pulses from separate points in a complex circuit may be required to reach a common point simultaneously in order to actuate a coincidence gate. In order to test the intervening circuits, it is necessary to measure the pulse propagation time through these circuits in order to assure arrival of the various pulses at the desired point during the prescribed time interval.

Because the propagation time in such environments is extremely short, apparatus for making such measurements must respond quickly and must be highly accurate. Furthermore, since the pulses encountered in such environments deviate from the ideal rectangular wave shape, some means must be provided for minimizing the effects of pulse distortion.

Time interval measuring circuits are known in the prior art. Many of these devices, however, are incapable of responding to pulse delays in the low nanosecond range required for propagation measurements.

In some of these prior art circuits, a "time stretching" technique is used in which a capacitor is charged rapidly at a known rate during the interval between pulses. The capacitor is then discharged at a slower known rate and the time required for the charge to decay to a specified cutoff level is used as a measure of the time during which the capacitor was being charged.

This method, however, has somewhat limited accuracy since the slow discharge rate necessarily implies that the voltage decay curve approaches the specified cutoff level at a small angle and thus obscures the actual crossing point.

An object of the present invention is to provide a time interval measuring apparatus capable of providing accurate measurements between closely spaced pulses.

SUMMARY OF THE INVENTION

The present invention includes circuits that permit a capacitor to charge at a linear rate during the time interval between consecutive pulses so that the magnitude of the charge on the capacitor is a direct measure of this time interval. Individual halves of a dual FET are used in discharge and hold circuits that are connected so as to balance out the leakage currents and thus retain the proper capacitor charge.

BRIEF DESCRIPTION OF THE DRAWING

The single figure is a circuit diagram, partly in block form, illustrating a presently preferred embodiment of the invention.

DESCRIPTION OF THE PREFERRED EMBODIMENT

In general, the apparatus of the present invention is intended to be used in measuring time intervals in which a stimulus pulse is applied to an external electric circuit so as to cause a signal to propagate through the external circuit and produce a response pulse at the output of the circuit.

The stimulus pulse starts the measurement interval and the response pulse stops the measurement interval. Because the propagation delay times may be extremely short, the stimulus and response pulses may overlap. That is, the leading edge of the response pulse may occur before the trailing edge of the stimulus pulse occurs. This requires a measuring scheme in which the response pulse can stop the measurement interval even though the stimulus pulse still exists.

In measuring the propagation delay in such circuits with the apparatus of the figure, stimuli pulses are applied to the START terminal 11 of FIG. 1 and the response pulses are applied to the STOP terminal 13.

In order to obtain meaningful results, the circuit of the invention is designed to respond to amplitude points of the same predetermined level on the leading edges of the stimuli and response pulses.

The voltage of an ideal rectangular pulse would change instantaneously from zero slope to infinite slope at the inception of the pulse. In practical pulses, however, there is some distortion at this point. Furthermore, the leading edges of the pulses do not have infinite slope. Therefore, the circuit of the present invention measures the delay time between preassigned amplitude points on the wave fronts of the stimuli and response pulses.

Referring again to FIG. 1, the stimulus pulse that is applied to the terminal 11 passes through an RC network 15 and to the base of a transistor 17. A second transistor 19 cooperates with the transistor 17 to form a transistor switching pair. These transistors are coupled to a suitable source of voltage through collector resistors 21 and 23. The emitters of these two transistors are connected together and coupled to a suitable source of negative voltage through a common collector resistor 25. The base of the transistor 19 is maintained at a desired voltage level by means of a voltage divider comprising the resistors 27 and 29 and the capacitor 31. The voltage divider is proportioned so that the transistor 19 is normally conducting. This necessarily maintains the transistor 17 in the normally cutoff condition and constitutes the quiescent state of the switching pair. The voltage divider is further proportioned so that a stimulus input pulse must reach a predetermined instantaneous amplitude before switching can occur.

The capacitor 31 provides a "stiff" reference voltage so that the transistor bias is unaffected by spurious transients.

A similar transistor switching pair including the transistors 33 and 35 is connected to receive a response pulse through the terminal 13. This response pulse passes to ground through a resistor 37. The transistors 33 and 35 are coupled to a positive voltage applied to a terminal 36 through the collector resistors 39 and 41. The emitters of these transistors are coupled to a source of negative voltage through a common emitter resistor 43. The transistor 35 is also biased by means of the voltage divider formed from the resistors 27 and 29 so as to be normally conducting in the same fashion, and biased to the same level, as the corresponding transistor 19. The collector resistors 17, 23, 39 and 41 associated with the transistors in the switching pairs are selected so that these transistors are maintained below the saturation level while they are in the conducting state. By maintaining these transistors below the saturation level, the switching speed is enhanced and the ability to measure extremely short time intervals is realized.

The collector of the transistor 19 in the first switching pair is coupled through a capacitor 45 to the base of an output transistor 47. This transistor is biased to a normally cutoff condition through a resistor 49 and a Zener diode 51. The voltage across the Zener diode is maintained at a suitable level by means of the resistor 53 and the capacitor 55. The collector voltage is maintained at a suitable value by means of the series resistors 57 and 59. The resistor 59 is shunted by an adjustable capacitor 61. This capacitor provides an accelerated action when the transistor 47 is switched to a conducting state in response to a stimulus pulse.

A transistor 63 is connected between a positive voltage source and the collector of the transistor 33. This transistor is normally biased to a cutoff condition when the transistor 33 is not conducting.

A current source transistor 65 has its base connected between the resistors 57 and 59. This transistor acts as a constant current source for charging the capacitor 67. The collector of the transistor 65 is connected directly to the capacitor 67 and the emitter of the transistor 65 is coupled to a positive voltage source through a resistor 69, a variable resistor 71 and a diode 73. The diode 73 is also connected through a Zener diode 75 and a resistor 77 to a suitable source of negative voltage. The Zener diode is further connected to the base of the transistor 65 through a diode 79.

Between charging intervals, the transistor 47 is cutoff. This permits the base of the constant current transistor to rise to substantially the potential of the terminal 36. This back-biases the diode 79 and maintains the transistor 65 in the cutoff condition.

At the inception of a charging interval, the transistor 47 is driven into conduction, thereby causing a significant current flow through the resistor 57. This forward-biases the diode 79 and drives the current source transistor 65 into conduction.

During a charging interval, the base-to-emitter voltage of the transistor 65 is maintained at a constant value by the Zener diode 75 and the diode 79.

At the termination of the charging interval, the transistor 63 is driven into conduction thus returning the base of the constant current transistor 65 to the voltage of the terminal 36 and cutting off this transistor.

The capacitor 67 is shunted by a discharge field effect transistor 81. This transistor is energized from a one shot multivibrator 83 so as to be normally conducting. The multivibrator is actuated by a signal from the transistor 17 so that when the transistor 17 is driven into conduction by a stimulus pulse applied to the terminal 11, the resulting voltage drop on the collector of the transistor 17 will switch the multivibrator into its quasi-stable state. This will drive the transistor 81 into its nonconducting state so that its resistance approaches infinity, thus insuring that the capacitor remains discharged until the stimulus pulse is received. The multivibrator is designed to have a quasi-stable state lasting for a period of time suitable for measuring the voltage on the capacitor 67. In typical operations, the multivibrator 83 has a period in the order of 400 microseconds.

The capacitor 67 is further shunted by a holding circuit including a first field effect transistor 85 and a second field effect transistor 87. The transistor 85 operates as a source-follower and the transistor 87 operates as an adjustable constant current source. The gate terminal of the transistor 87 is connected directly to a source of negative voltage through a connector 89. The source terminal of the transistor 87 is connected to the same negative voltage source through a variable resistor 91. An output signal is taken from the terminal 93 connected between the transistors 85 and 87.

The discharge transistor 81 and the source-follower transistor 85 are preferably formed from individual halves of a dual field effect transistor. This aids in balancing out the leakage currents associated with the capacitor 67 as will be explained later.

In operation, a positive-going stimulus pulse applied to the terminal 11 is shortened by the RC network 15. The components in this network are chosen so that the stimulus pulse applied to the transistor 17 is shorter than the corresponding response pulse subsequently applied to the transistor 33.

The stimulus pulse drives the transistor 17 into conduction. The resulting increase in emitter current in this transistor forces the emitter voltage of transistor 19 upward and cuts off transistor 19. The current flow through the resistor 23 is thus diverted from the transistor 19 and appears at the base of the transistor 47, driving this transistor into conduction. When the transistor 47 is driven into conduction, the resulting collector current flow causes the transistor 65 to conduct thereby charging the capacitor 67. This starts the charging cycle. The resistors 69 and 71 have a relatively high value and the capacitor 67 charges at a substantially linear rate. Thus, the charge ultimately stored on the capacitor is proportional to the length of time during which this capacitor is charged.

At the same time that the transistor 17 was driven into conduction, the multivibrator 83 was switched to its quasi-stable state and the transistor 81 was driven to cutoff, thus permitting charge to accumulate on the capacitor 67.

When the response pulse is subsequently applied to the transistor 33 through the terminal 13, this transistor is driven into conduction and the transistor 35 is driven to cutoff. This causes the transistor 63 to conduct so that the resistor 57 is shorted out. This permits the base voltage on the transistor 65 to approach the positive voltage on the terminal 36 even though the stimulus pulse still exists. The transistor 65 is thereby cut off and the charging cycle for the capacitor 67 is stopped.

The transistor 81 is maintained in its cutoff condition for an additional length of time necessary to measure the charge accumulated on the capacitor 67.

The field effect transistors 85 and 87 are arranged in a circuit such that the voltage on the terminal 93 is essentially the same as the gate voltage applied to the transistor 85 from the capacitor 67. This is adjusted by means of the variable resistor 91 associated with the field effect transistor 87. As is known in the prior art, the drain current on a field effect transistor can be adjusted so that there is no voltage difference between the source and the gate electrodes.

Thus, by adjusting the resistor 91 the voltage on the terminal 93 can be made essentially equal to the capacitor voltage throughout a desired range of operation, yet the transistor 85 serves as an extremely high impedance load that prevents discharge of the capacitor 67.

Any leakage that does occur through the transistors 85 and 87 is balanced by a corresponding leakage through the transistor 81. Since leakage through the transistor 85 tends to charge the capacitor 67 and the leakage through transistor 71 tends to discharge the capacitor, these transistors serve to maintain the desired charge across the capacitor. Since the transistors 81 and 85 are individual halves of a dual transistor, the amount of leakage through each is essentially the same and the capacitor neither gains nor loses charge after a response pulse terminates the charging interval. This provides a steady voltage until the multivibrator 83 switches back to its stable state. An output signal is taken from the terminal 93. The voltage level of the output signal is taken as an indication of the pulse interval to be measured. In typical circuits, time intervals may be measured in the range of 2—100 nanoseconds.

The output voltage may be read on any one of a variety of conventional readout means. Digital voltmeters and oscilloscopes have been used for this purpose. For repetitive outputs, a peak reading voltmeter calibrated in nanoseconds may be used.

The variable capacitor 61 is used to calibrate the low end of the scale by regulating the time necessary for the current source transistor 65 to become conductive so as to initiate the charging interval.

The variable resistor 71 regulates the rate at which the capacitor 67 is charged and can thus be used to calibrate the high end of the scale.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Apparatus for measuring the time delay between consecutive pulses comprising a storage capacitor; charging means to charge said capacitor at a substantially linear rate throughout a charging interval; first and second switching means coupled to said charging means to initiate and terminate a charging interval, respectively; a first field effect transistor connected across said storage capacitor and biased to be normally conducting; means in said first switching means to drive said first field effect transistor into the cutoff condition for a predetermined period commencing with the initiation of the charging interval; an output terminal; a holding circuit, said holding circuit including a second field effect transistor having its gate electrode connected to a terminal on said capacitor and its source electrode connected to said output terminal; and means in said holding circuit to bias said second field effect transistor so that its gate and source electrodes are at essentially the same voltage level.

2. The apparatus of claim 1 in which said first and second switching means each includes a transistor switching pair biased to remain in the quiescent state until actuated by a stimulus or response input pulse respectively.

3. The apparatus of claim 2 in which each of the switching pairs is biased so that the instantaneous amplitude of an input pulse will reach the same predetermined value before a transistor pair is actuated.

4. The apparatus of claim 3 in which each switching pair includes first and second transistors, said first transistor in each pair being connected to receive the input signals applied to that pair; means to provide a forward biasing signal; each of said second transistors being normally biased to the same conductivity level by said forward biasing signal; each of said first transistors being biased to cutoff by the current flowing through the second transistor in the same pair so that any input signal must reach the same specified instantaneous amplitude before the corresponding first transistor actuates that switching pair.

5. The apparatus of claim 1 further characterized in that said first field effect transistor has a drain electrode, a source electrode, and a gate electrode; said drain electrode being connected to one terminal of said capacitor; said source electrode being connected to the other terminal of said capacitor; said apparatus being further characterized in that said means to drive the first field effect transistor into the cutoff condition is a one-shot multivibrator having its output connected to the gate electrode of said first field effect transistor.

6. The apparatus of claim 4 in which the gate electrode of said second field effect transistor is connected to the same capacitor terminal as the drain electrode of the first field effect transistor, and in which the means to bias said second field effect transistor is an adjustable constant current source connected to the source electrode of said second field effect transistor.

7. The apparatus of claim 5 in which said adjustable constant current source includes a third field effect transistor having a drain electrode connected to said output terminal, a gate electrode connected directly to a source of negative voltage and a source electrode coupled to said source of negative voltage through a variable resistor, said variable resistor having a resistance suitable to adjust the current through said third field effect transistor to a value sufficient to equalize the gate and source voltages on said second field effect transistor.

8. The apparatus of claim 1 wherein each of said switching means includes first and second transistors arranged as a switching pair in which conduction in either one of said transistors drives the other transistor to cutoff, said switching pair being further proportioned so that the maximum current through either transistor is limited to a value below the saturation value for that transistor.